(12) United States Patent
Bungo

(10) Patent No.: US 8,903,634 B2
(45) Date of Patent: Dec. 2, 2014

(54) ENGINE CONTROL APPARATUS

(75) Inventor: Keiichiro Bungo, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 587 days.

(21) Appl. No.: 13/114,575

(22) Filed: May 24, 2011

(65) Prior Publication Data

US 2012/0053809 A1  Mar. 1, 2012

(30) Foreign Application Priority Data

Aug. 24, 2010  (JP) .................. 2010-187437

(51) Int. Cl.
*F02D 41/06* (2006.01)
*F02D 29/06* (2006.01)
*F02B 63/04* (2006.01)
*F02D 31/00* (2006.01)
*F02D 41/02* (2006.01)
*H02P 9/04* (2006.01)
*F02D 11/10* (2006.01)

(52) U.S. Cl.
CPC ................ *F02D 29/06* (2013.01); *F02B 63/04* (2013.01); *F02D 31/003* (2013.01); *F02D 41/021* (2013.01); *H02P 9/04* (2013.01); *F02D 11/105* (2013.01); *F02D 2200/021* (2013.01); *F02D 2200/0404* (2013.01)
USPC ..... 701/113; 701/99; 123/339.1; 123/339.16; 123/339.24

(58) Field of Classification Search
USPC ................. 701/99, 102, 104, 113; 123/339.1, 123/339.16, 339.24, 399
See application file for complete search history.

(56) References Cited

U.S. PATENT DOCUMENTS

| 4,581,924 | A | * | 4/1986 | Otobe et al. | ............... 73/114.36 |
| RE33,027 | E | * | 8/1989 | Danno et al. | ............. 123/339.22 |
| 4,930,079 | A | * | 5/1990 | Kondo | ........................... 701/58 |
| 5,038,880 | A | * | 8/1991 | Matsuoka et al. | ............ 180/179 |
| 5,117,682 | A | * | 6/1992 | Amano | ...................... 73/114.36 |
| 5,148,721 | A | * | 9/1992 | Anan et al. | ...................... 701/53 |
| 5,211,680 | A | * | 5/1993 | Sumimoto et al. | ............ 477/109 |
| 5,473,936 | A | * | 12/1995 | Sasakura et al. | ........... 73/114.36 |

(Continued)

FOREIGN PATENT DOCUMENTS

| JP | S623144 A | 1/1987 |
| JP | 8-11073 Y2 | 3/1996 |
| JP | 2005-229675 A | 8/2005 |
| JP | 2006-170037 A | 6/2006 |

OTHER PUBLICATIONS

Japanese Office Action with English translation dated Jul. 31, 2013.

*Primary Examiner* — Thomas G Black
*Assistant Examiner* — Peter D Nolan
(74) *Attorney, Agent, or Firm* — Westerman, Hattori, Daniels & Adrian, LLP

(57) ABSTRACT

The engine control apparatus includes a governor control mechanism for keeping the engine frequency constant, decides the "presence" or "absence" of the engine load by the throttle aperture and forcibly changes the engine frequency to a predetermined frequency depending on the presence or absence of the load, the engine control apparatus includes an engine controlling unit (10) for controlling fuel supply to an engine (1), an engine temperature detecting unit (4) for detecting an engine temperature of the engine (1), and a threshold changing unit (10a) for changing each throttle aperture as a threshold for deciding the "presence" or "absence" of an engine load depending on the engine temperature detected by the engine temperature detecting unit (4).

6 Claims, 3 Drawing Sheets

(56) References Cited

U.S. PATENT DOCUMENTS

| | | | |
|---|---|---|---|
| 5,501,193 A * | 3/1996 | Schneider et al. | 123/339.14 |
| 5,514,049 A * | 5/1996 | Kamio et al. | 477/111 |
| 5,775,106 A * | 7/1998 | Denz et al. | 60/605.1 |
| 6,148,795 A * | 11/2000 | Gerhardt et al. | 123/436 |
| 7,031,822 B1 * | 4/2006 | Hashimoto et al. | 701/103 |
| 7,040,284 B2 * | 5/2006 | Demura et al. | 123/339.11 |
| 7,240,665 B2 * | 7/2007 | Hoshino et al. | 123/399 |
| 7,949,458 B2 * | 5/2011 | Yasui et al. | 701/102 |
| 2004/0008009 A1 | 1/2004 | Fukaya | |
| 2005/0092295 A1 * | 5/2005 | Hoshino et al. | 123/399 |

\* cited by examiner

ENGINE CONTROL APPARATUS

TECHNICAL FIELD

The present invention relates to an auto throttle apparatus for automatically lowering a frequency of an engine during no load, and particularly to an engine control apparatus in the auto throttle apparatus capable of further lowering a frequency of a standby engine during no-load running.

BACKGROUND ART

There is typically known an "auto throttle function" for a general-purpose engine used as a drive source such as power generator which uses a unit such as sensor to detect a load on the engine and reduces an engine frequency to a target rotational frequency (low idle) during no load, thereby decreasing noises and improving fuel efficiency.

There is also known a technique called "electronic governor" which controls a throttle aperture in CPU for an adjustment mechanism called governor mechanism which keeps a frequency of an engine constant. When achieving the auto throttle function by the technique, there is known a method for detecting a throttle aperture to estimate a load on an engine, and lowering a set frequency when the load is small.

In other words, when the auto throttle function is achieved by the electronic governor, the engine is started to end air warming, and then a target rotational frequency of the electronic governor is set at a low engine frequency (NEL) called low idle during no load. When the throttle aperture exceeds a preset threshold of the throttle aperture with increase in external load, the engine load is decided as "present" and the target rotational frequency is increased to a high engine frequency (NEH).

To the contrary, when the throttle aperture falls below the preset threshold of the throttle aperture with no load, the engine load is decided as "absent" and the target rotational frequency is lowered to the low engine frequency (NEL) as low idle.

CITATION LIST

Patent Literature

Patent Literature 1 Japanese unexamined Patent Publication No. 2005-229675
Patent Literature 2 Japanese unexamined Patent Publication No. 2006-170037
Patent Literature 3 Japanese Examined Utility Model (Registration) Application Publication No. 8-11073

SUMMARY OF INVENTION

Technical Problem

In the case of an engine for power generator in the governor mechanism, for example, it is desired that the engine is kept at a high frequency for generating power also when a load connected to the power generator is low such as light bulb. Thus, when the auto throttle function is realized, the set value of the threshold of the throttle aperture by which the engine load is decided as "present" is required to be as low as possible.

However, when the auto throttle function is realized by the electronic governor, since an internal load of the engine itself varies depending on an external temperature and thus the throttle aperture fluctuates also when no external load is present at the engine output, there is a problem that the setting of the threshold of the throttle aperture for deciding the presence or absence of the load is difficult.

In other words, since when the external temperature changes, a difference in expansion rate inside the engine or viscosity of an engine oil changes and thus the internal load of the engine also varies, there occurs a phenomenon that the throttle aperture fluctuates within the range in dotted lines as shown in FIG. 4A also when no load is present at the engine output, for example. In order to decide the presence or absence of the external load in the state by the threshold of the throttle aperture, it is required that the threshold is set to be higher thereby to address the fluctuation of the throttle aperture.

For the threshold of the throttle aperture for deciding the "absence" of the external load, the usage area of the external load basically ranges from full throttle (WOT) to the threshold as shown in FIG. 4B, and thus the threshold should be possibly set to be lower in order to secure the wide usage area.

However, as described above, since the internal load of the engine itself varies due to the external temperature, the threshold of the throttle aperture for deciding the presence or absence of the load needs to be set to be higher in order to secure the low idle state during no load at the engine output, and consequently there is a problem that the setting of the threshold of the throttle aperture for deciding the external load as "absent" is difficult.

The present invention has been made in terms of the above circumstances, and it is an object thereof to provide an engine control apparatus capable of easily setting a threshold of a throttle aperture for deciding the presence or absence of an engine load in order to restrict a frequency of a standby engine in the no-load running state to be lower.

Solution to Problem

To achieve the above object, the present invention of the claim 1 is an engine control apparatus which comprises a governor control mechanism for keeping an engine frequency constant, decides the "presence" or "absence" of an engine load by a throttle aperture, and forcibly changes the engine frequency to a predetermined frequency depending on the presence or absence of the load, comprising:

an engine controlling unit (10) for controlling fuel supply to an engine (1);

an engine temperature detecting unit (4) for detecting an engine temperature of said engine; and a threshold changing unit (10a) for changing each throttle aperture as a threshold for deciding the "presence" or "absence" of an engine load depending on the engine temperature detected by said engine temperature detecting unit (4).

The present invention of the claim 2 is the engine control apparatus according to claim 1, wherein said engine controlling unit (10) comprises a storing unit (10b), and said storing unit (10b) holds map data configured by plotting each throttle aperture corresponding to the engine temperature per threshold for deciding the "presence" or "absence" of the engine load.

The present invention of the claim 3 is the engine control apparatus according to claim 2, wherein each throttle aperture of said map data is smaller as the engine temperature is higher.

The present invention of the claim 4 is the engine control apparatus according to any of claims 1 to 3, wherein the engine temperature is periodically detected by the engine temperature detecting unit (4) to update the threshold changed by the threshold changing unit (10a).

Advantageous Effects of Invention

According to the first aspect, in the engine control apparatus including an auto throttle function with a governor mechanism, a threshold of a throttle aperture for deciding the "presence" or "absence" of an engine load is decided from a map value decided by an engine temperature, thereby improving detection accuracy in detecting a load.

Consequently, an auto throttle mechanism can be realized even with slight external load and an adaptable load area can be enlarged, thereby restricting a frequency of the standby engine in the no-load running state to be lower.

According to the second aspect, the map data can be used to easily decide the throttle aperture as the threshold.

According to the third aspect, the throttle aperture is set to be smaller as the engine temperature is higher in the map data, thereby setting the throttle aperture as the threshold suitable for the variation of the engine temperature.

According to the fourth aspect, the engine temperature is periodically detected to constantly update the threshold and thus a suitable threshold aperture can be constantly set as the threshold for deciding the "presence" or "absence" of the engine load.

DESCRIPTION OF EMBODIMENTS

Figure 1:
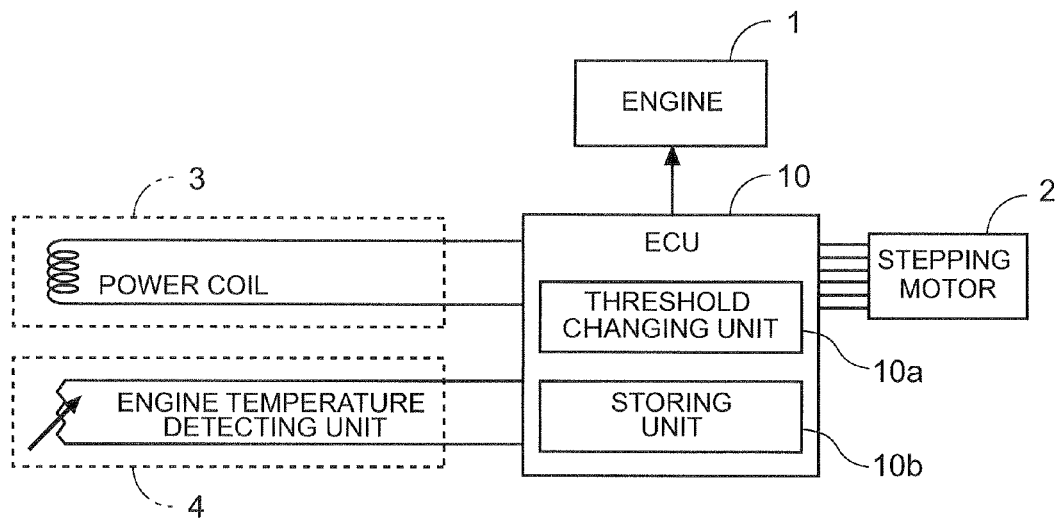
FIG. 1 is a block diagram of an engine control apparatus according to one embodiment of the present invention.

On exemplary embodiment of an engine control apparatus according to the present invention will be described below with reference to the drawings.

The engine control apparatus according to the present invention is directed for controlling a general-purpose engine used as a drive source such as power generator, includes a governor control mechanism for keeping an engine frequency constant, and decides the "presence" or "absence" of an engine load by a throttle aperture thereby to forcibly change the engine frequency to a predetermined frequency depending on the "presence" or "absence" of the load.

The engine control apparatus includes an engine controlling unit (ECU) 10 for controlling fuel supply to an engine 1, a throttle aperture detecting unit 2 for detecting an aperture of a throttle valve provided in a fuel supply passage to the engine, an engine frequency detecting unit 3 for detecting an engine frequency of the engine 1, and an engine temperature detecting unit 4 for detecting an engine temperature of the engine 1. The engine controlling unit (ECU) 10 includes a threshold changing unit 10a for changing each throttle aperture as a threshold for deciding the "presence" or "absence" of an engine load and a storing unit 10b for storing map data of the threshold therein.

The engine controlling unit 10 is connected to the throttle aperture detecting unit 2, the engine frequency detecting unit 3 and the engine temperature detecting unit 4 and controls fuel supply to the engine 1 based on information input from the units, or the like, and the fuel supply control is performed by adjusting the throttle aperture by a throttle valve opening/closing unit in the governor control mechanism provided in the engine 1.

A stepping motor is used as a drive source of the throttle valve for the throttle opening/closing unit in the governor control mechanism, and the position of the stepping motor is digitally grasped by the throttle aperture detecting unit 2 to detect the throttle aperture and to store the throttle position in EEPROM of the ECU.

The throttle aperture detecting unit 2 may detect the throttle aperture by using a throttle aperture sensor called throttle position sensor (TPS) instead of detecting the position of the stepping motor.

The engine frequency detecting unit 3 includes a power coil, the power coil is excited by a magnet provided inside a flywheel of the engine to generate AC power, and the AC power waveform is shaped to detect the engine frequency.

The generated AC power is rectified by an internal circuit of the engine controlling unit (ECU) 10 and is used as a power supply of the stepping motor for the engine controlling unit (ECU) 10 and the throttle aperture detecting unit 2.

The engine temperature detecting unit 4 is configured of a thermistor sensor arranged near an engine head, for example. The engine temperature detecting unit 4 only has to take a correlation between a detected temperature and an engine temperature, and may detect the engine temperature at other position or with other detecting method.

The threshold changing unit 10a sets THa and THb as the threshold of the throttle aperture for deciding the "presence" or "absence" of the engine load relative to the engine temperature detected by the engine temperature detecting unit 4.

In other words, for the same engine frequency, when the load on the engine is small, the throttle aperture is closed, and when the load is large, the throttle aperture is opened, thereby deciding the presence or absence of the engine load by the throttle aperture.

Figure 2:
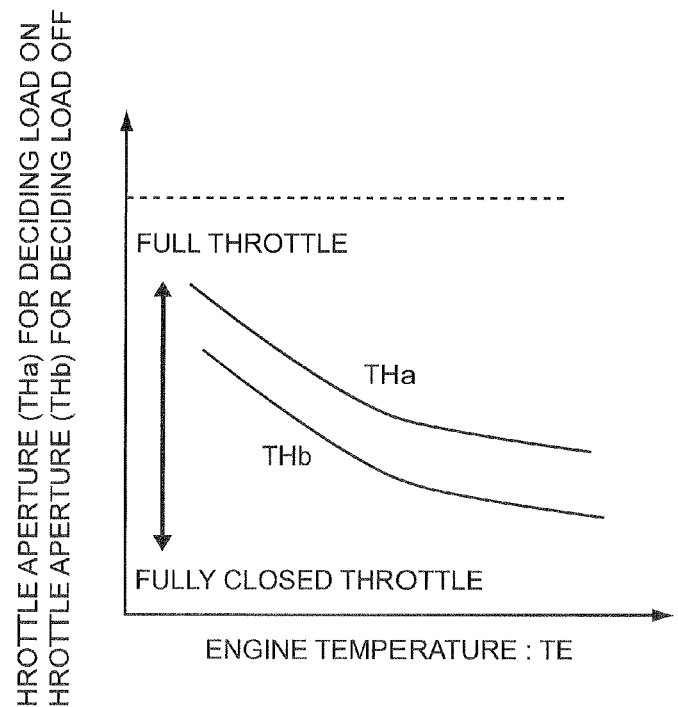
FIG. 2 is a graph showing one example of a relationship between an engine temperature and a throttle aperture stored as map data in a storing unit in the engine control apparatus.

The threshold THa is a value of the throttle aperture when the engine load is decided as "present" based on the load-absent state. The threshold THb is a value of the throttle aperture when the engine load is decided as "absent" based on the load-present state. The threshold THa and the threshold THb are set to be variable depending on the engine temperature. As shown in FIG. 2, the threshold THa and the threshold THb are selected based on map data in the graph in which a small throttle aperture is plotted as the engine temperature is higher. In the graph, the threshold THa is set to be higher than the threshold THb relative to the same engine temperature.

The engine temperature is periodically detected by the engine temperature detecting unit 4 so that the threshold THa and the threshold THb are constantly updated, which are changed by the threshold changing unit 10a.

The storing unit 10b is provided in the engine controlling unit (ECU) 10 and holds the map data on the preset threshold THa and threshold THb indicated in FIG. 2.

Figure 3:
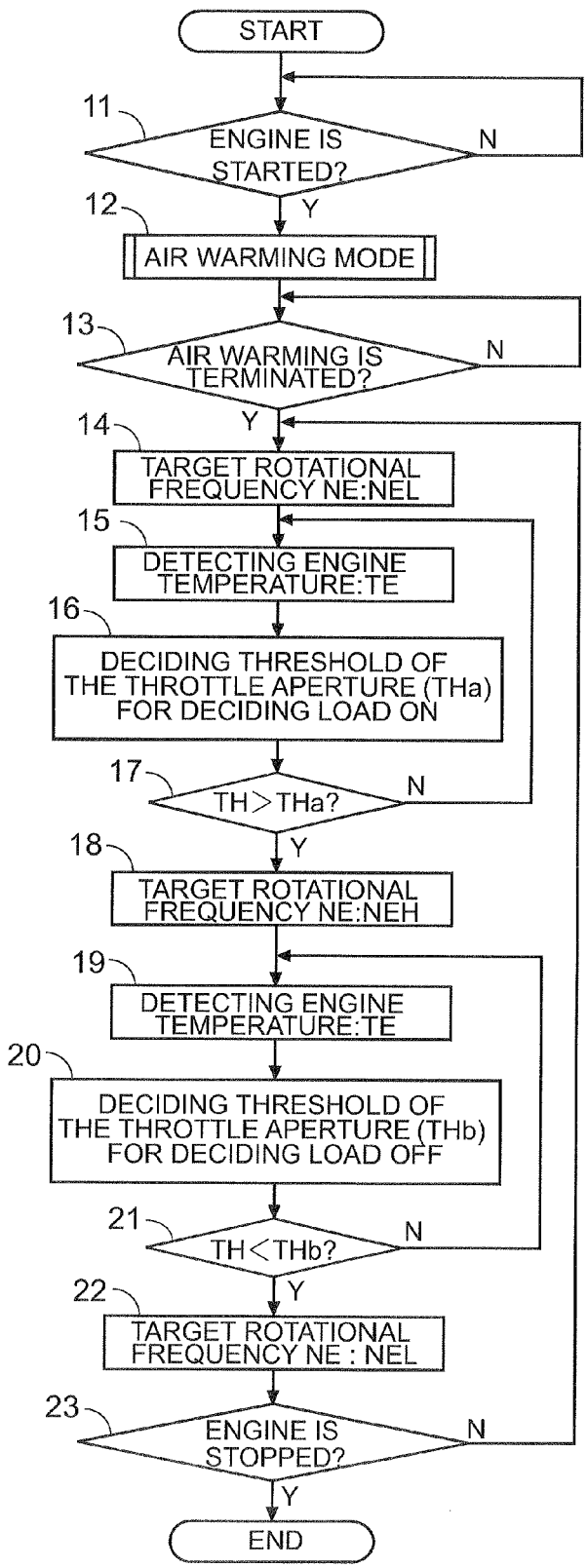
FIG. 3 is a flowchart showing a procedure of setting a threshold of the throttle aperture in the engine control apparatus.
Figure 4A:
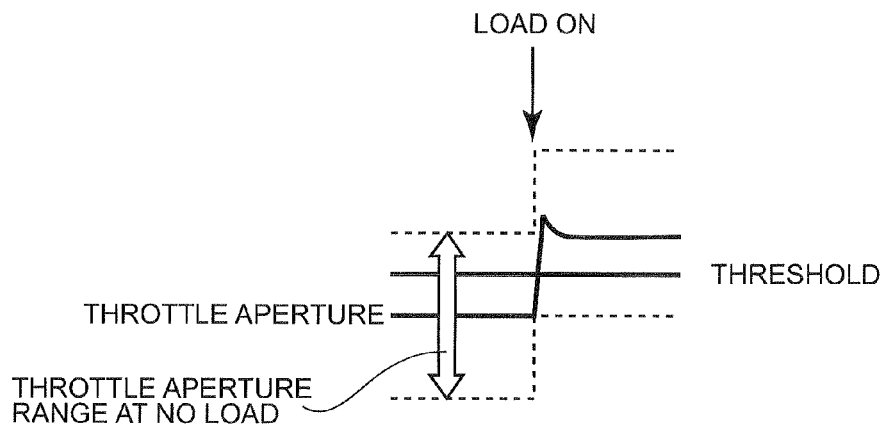
FIG. 4A is a waveform diagram for explaining example of a fluctuation of the throttle aperture when a load is present or absent, where the waveform diagram for the throttle aperture from when a load is absent to when a load is present
Figure 4B:
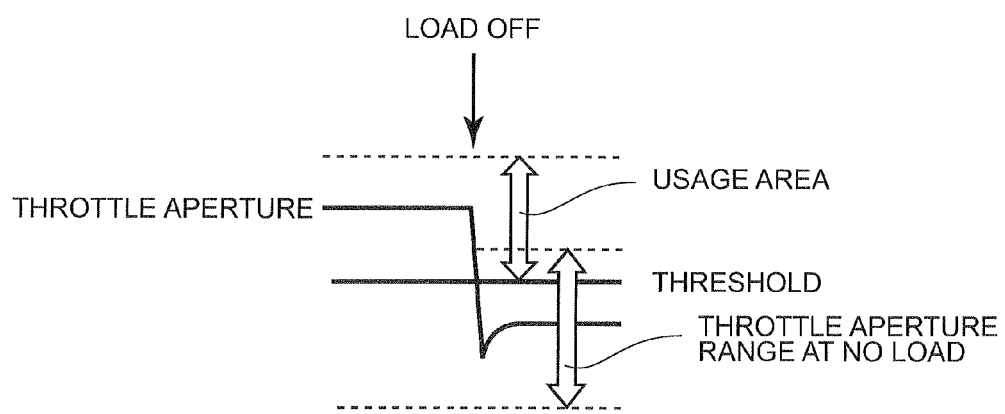
FIG. 4B is a waveform diagram for explaining example of a fluctuation of the throttle aperture when a load is present or absent, where the waveform diagram for the throttle aperture from when a load is present to when a load is absent.

A control procedure by the engine control apparatus will be described below with reference to FIG. 3.

The starting of the engine is detected (step 11), the engine is operated in the air warming mode in the load-absent state (step 12), and the operating in the air warming mode is terminated when the engine temperature exceeds a certain temperature by the detection of the engine temperature (step 13).

When the auto throttle function is realized by the electronic governor, after the engine is started to terminate the air warming, a target rotational frequency of the electronic governor is set at the low engine frequency (NEL) called low idle during no load (step 14).

Next, the engine temperature TE is detected from the engine temperature sensor 4 (step 15).

The threshold changing unit 10a decides the threshold (THa) of the throttle aperture by which the engine load is decided as "present" relative to the detected engine temperature TE, based on the graph of the map data in the storing unit 10b (step 16). Since when the detected engine temperature is low, the internal load is large, the threshold (THa) is set to be higher, and since the internal load is lower as the engine temperature is higher, the threshold is set to be gradually smaller.

Thereafter, when an external load is imposed and the throttle aperture (TH) exceeds the latest threshold (THa), the engine load is decided as "present" (step 17) and the target rotational frequency is increased to the high frequency (NEH) (step 18).

When the throttle aperture (TH) is equal to or less than the threshold (THa), the engine load is decided as "absent" (step 17), the engine temperature TE is detected again (step 15), and the threshold corresponding to the engine temperature TE is updated by the threshold changing unit 10a.

The processings are continued so that the latest threshold (THa) corresponding to the detected engine temperature TE can be selected.

When the target rotational frequency is increased to the high frequency (NEH) (step 18) and the engine load is detected as "absent", at first the engine temperature TE is detected from the engine temperature sensor 4 (step 19).

The threshold changing unit 10a decides the threshold (THb) of the throttle aperture by which the engine load corresponding to the engine temperature is decided as "absent", based on the graph of the map data in the storing unit 10b (step 20).

Thereafter, when the external load is absent and the throttle aperture (TH) falls below the latest threshold (THb), the engine load is decided as "absent" (step 21), and the target rotational frequency is lowered to the low engine frequency (NEL) as low idle (step 22).

When the throttle aperture (TH) is equal to or more than the threshold (THb), it is decided that the engine load remains "present" (step 21), the engine temperature TE is detected again (step 19), and the threshold corresponding to the engine temperature TE is updated by the threshold changing unit 10a.

The processings are continued so that the latest threshold (THb) corresponding to the engine temperature can be selected.

After the target rotational frequency is reduced to the low engine frequency (NEL) as low idle, a determination is made as to whether the engine is stopped (step 23), and when the engine is not stopped, the processing returns to step 19 to continue the control.

When the engine is stopped (step 23), the control is terminated.

According to the engine control apparatus, since the threshold of the throttle aperture for deciding the "presence" or "absence" of the engine load is controlled to be changed depending on the engine temperature, also when the internal load of the engine varies due to the external temperature, each threshold (THa and THb) suitable for deciding the "presence" or "absence" of the engine load can be set, thereby preventing erroneous detection of the external load for the auto throttle function.

Consequently, even a low external load can be detected thereby to detect the auto throttle, and the usage area of the external load from full throttle to the threshold can be enlarged, thereby restricting the frequency of the standby engine in the no-load running state to be lower.

Reference Signs List

1 ... engine
2 ... throttle aperture detecting unit
3 ... engine frequency detecting unit
4 ... engine temperature detecting unit
10 ... engine controlling unit
10a ... threshold changing unit
10b ... storing unit

The invention claimed is:

1. An engine control apparatus which comprises a governor control mechanism for keeping an engine frequency constant, configured to decide a "presence" corresponding to a load-absent state or an "absence" corresponding to a load-present state of an engine load by a throttle aperture, and forcibly configured to change an engine frequency to a predetermined frequency depending on the presence or absence of the load, comprising:
    an engine controlling unit (10) for controlling fuel supply to an engine (1);
    an engine temperature detecting unit (4) for detecting an engine temperature of said engine; and
    a threshold changing unit (10a) for changing a throttle aperture used as a threshold for deciding the "presence" or "absence" of the engine load based on the engine temperature detected by said engine temperature detecting unit (4);
    said threshold changing unit sets a threshold Tha and a threshold THb;
    said threshold Tha is a value of the throttle aperture used to decide whether the engine load is "present" based on the load-absent state, and the threshold changing unit changes the threshold Tha to decrease the value of the threshold Tha in response to an increase in the temperature detected by the engine temperature detecting unit; and
    said threshold Thb is a value of the throttle aperture used to decide whether the engine load is "absent" based on the load-present state, and the threshold changing unit changes the threshold Thb to decrease the value of the threshold Thb in response to an increase in the temperature detected by the engine temperature detecting unit.

2. The engine control apparatus according to claim 1, wherein said engine controlling unit (10) comprises a storing unit (10b), and
    said storing unit (10b) holds map data configured by plotting each throttle aperture corresponding to the engine temperature per threshold for deciding the "presence" or "absence" of the engine load; and
    the threshold Tha in said map data is set to be higher than the threshold Thb relative to the engine temperature.

3. The engine control apparatus according to claim 2, wherein each throttle aperture of said map data is smaller as the engine temperature is higher.

4. The engine control apparatus according to claim 3, wherein the engine temperature detecting unit (4) is configured to periodically detect the engine temperature to update the threshold changed by the threshold changing unit (10*a*).

5. The engine control apparatus according to claim 2, wherein the engine temperature detecting unit (4) is configured to periodically detect the engine temperature to update the threshold changed by the threshold changing unit (10*a*).

6. The engine control apparatus according to claim 1, wherein the engine temperature detecting unit (4) is configured to periodically detect the engine temperature to update the threshold changed by the threshold changing unit (10*a*).

* * * * *